(12) United States Patent
Hoffmann et al.

(10) Patent No.: US 9,744,872 B2
(45) Date of Patent: Aug. 29, 2017

(54) SELF-PROPELLING WORK MACHINE AND METHOD FOR BRAKING SUCH A WORK MACHINE

(71) Applicant: Liebherr-Components Biberach GmbH, Biberach an der Riss (DE)

(72) Inventors: Sebastien Nicolas Hoffmann, Colmar (FR); Burkhard Emanuel Richthammer, Freiburg (DE); Bernd Sommer, Biberach an der Riss (DE); Stefan Duelli, Eberhardzell (DE); Markus Merkle, Munderkingen (DE); Juergen Resch, Ingoldingen-Degernau (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 15/025,213

(22) PCT Filed: Sep. 9, 2014

(86) PCT No.: PCT/EP2014/002437
§ 371 (c)(1),
(2) Date: Mar. 25, 2016

(87) PCT Pub. No.: WO2015/043715
PCT Pub. Date: Apr. 2, 2015

(65) Prior Publication Data
US 2016/0229295 A1    Aug. 11, 2016

(30) Foreign Application Priority Data

Sep. 27, 2013 (DE) .................. 10 2013 016 126
Oct. 11, 2013 (DE) .................. 10 2013 016 915
Dec. 19, 2013 (DE) .................. 10 2013 021 608

(51) Int. Cl.
*B60L 7/10* (2006.01)
*B60L 11/18* (2006.01)
(Continued)

(52) U.S. Cl.
CPC ............ *B60L 11/1851* (2013.01); *B60K 6/22* (2013.01); *B60K 6/46* (2013.01); *B60K 25/00* (2013.01);
(Continued)

(58) Field of Classification Search
CPC .............. B60W 10/18; B60W 10/196; B60W 30/18127; B60W 30/18136; B60W 20/14; E02F 9/2083
See application file for complete search history.

(56) References Cited

U.S. PATENT DOCUMENTS 5,839,533 A * 11/1998 Mikami ................. B60K 6/365
                                                            180/165
6,318,487 B2 * 11/2001 Yanase ..................... B60K 6/46
                                                            180/65.245
(Continued)

FOREIGN PATENT DOCUMENTS

AT          12010 U2      9/2011
DE       10244769 A1      4/2004
(Continued)

OTHER PUBLICATIONS

ISA European Patent Office, International Search Report Issued in PCT Application No. PCT/EP2014/002436, Feb. 25, 2015, WIPO, 10 pages.
(Continued)

*Primary Examiner* — Brian Swenson
(74) *Attorney, Agent, or Firm* — McCoy Russell LLP

(57) ABSTRACT

The application describes a self-propelling work machine, in the form of a truck, having an electric drive comprising at
(Continued)

least one electric motor, a generator drivable by an internal combustion engine for the power supply of the electric drive, and a braking apparatus for braking the work machine, wherein the braking apparatus provides a regenerative braking by the electric drive and a feedback apparatus for feeding back electrical motor braking power of the electric motor to the generator to apply the motor braking power on the internal combustion engine. The application further describes a method for braking the work machine. A braking control apparatus is provided for an automatic connection of a mechanical brake in dependence on the motor braking power fed back to the internal combustion engine and/or in dependence on the operating state of the internal combustion engine acted on by the fed back motor braking power.

18 Claims, 2 Drawing Sheets

(51) Int. Cl.

| | | |
|---|---|---|
| *B60K 6/46* | (2007.10) |
| *B60W 10/06* | (2006.01) |
| *B60W 10/08* | (2006.01) |
| *B60W 10/184* | (2012.01) |
| *B60W 10/196* | (2012.01) |
| *B60W 10/30* | (2006.01) |
| *B60W 20/00* | (2016.01) |
| *B60W 30/18* | (2012.01) |
| *E02F 9/20* | (2006.01) |
| *E02F 3/76* | (2006.01) |
| *B60W 20/14* | (2016.01) |
| *B60L 7/18* | (2006.01) |
| *B60L 11/02* | (2006.01) |
| *B60K 6/22* | (2007.10) |
| *B60K 25/00* | (2006.01) |
| *B60W 10/18* | (2012.01) |
| *B60W 10/24* | (2006.01) |
| *B60K 6/28* | (2007.10) |

(52) U.S. Cl.
CPC .... *B60L 7/10* (2013.01); *B60L 7/18* (2013.01); *B60L 11/02* (2013.01); *B60L 11/1809* (2013.01); *B60W 10/06* (2013.01); *B60W 10/08* (2013.01); *B60W 10/18* (2013.01); *B60W 10/184* (2013.01); *B60W 10/196* (2013.01); *B60W 10/24* (2013.01); *B60W 10/30* (2013.01); *B60W 20/00* (2013.01); *B60W 20/14* (2016.01); *B60W 30/18127* (2013.01); *B60W 30/18136* (2013.01); *E02F 3/7609* (2013.01); *E02F 9/2075* (2013.01); *E02F 9/2083* (2013.01); *B60K 6/28* (2013.01); *B60L 2200/40* (2013.01); *B60W 2300/125* (2013.01); *B60W 2300/17* (2013.01); *B60W 2710/0627* (2013.01); *B60W 2710/0644* (2013.01); *B60Y 2200/411* (2013.01); *B60Y 2200/92* (2013.01); *B60Y 2300/18125* (2013.01); *B60Y 2300/43* (2013.01); *B60Y 2300/60* (2013.01); *B60Y 2300/91* (2013.01); *B60Y 2400/604* (2013.01); *B60Y 2400/61* (2013.01); *B60Y 2400/81* (2013.01); *B60Y 2400/87* (2013.01); *Y02T 10/6217* (2013.01); *Y02T 10/6286* (2013.01); *Y10S 903/93* (2013.01); *Y10S 903/947* (2013.01)

(56) References Cited

U.S. PATENT DOCUMENTS

| | | | |
|---|---|---|---|
| 6,986,727 B2* | 1/2006 | Kuras | B60K 6/46 477/4 |
| 7,261,170 B2 | 8/2007 | Leifert | |
| 7,950,481 B2 | 5/2011 | Betz et al. | |
| 8,395,335 B2 | 3/2013 | Marchand et al. | |
| 8,935,031 B2* | 1/2015 | Moriki | B60L 7/14 701/22 |
| 2005/0137060 A1 | 6/2005 | Kuras et al. | |
| 2008/0298977 A1 | 12/2008 | Juricak et al. | |

FOREIGN PATENT DOCUMENTS

| | | |
|---|---|---|
| DE | 102009033953 A1 | 2/2010 |
| DE | 102011012724 A1 | 8/2012 |
| DE | 102011013746 A1 | 9/2012 |
| DE | 102011089102 A1 | 6/2013 |
| DE | 102012208063 A1 | 11/2013 |
| EP | 2500197 A2 | 9/2012 |
| EP | 2666692 A1 | 11/2013 |
| WO | 2012099255 A1 | 7/2012 |
| WO | 2015043714 A1 | 4/2015 |

OTHER PUBLICATIONS

ISA European Patent Office, International Search Report Issued in PCT Application No. PCT/EP2014/002437, Mar. 2, 2015, WIPO, 10 pages.

* cited by examiner

SELF-PROPELLING WORK MACHINE AND METHOD FOR BRAKING SUCH A WORK MACHINE

CROSS REFERENCE TO RELATED APPLICATIONS

The present application is a U.S. National Phase of International Patent Application Serial No. PCT/EP2014/002437, entitled "Self-Propelled Working Machine and Method for Braking a Working Machine of This Type," filed on Sep. 9, 2014, which claims priority to German Patent Application No. 10 2013 021 608.7, filed on Dec. 19, 2013, and to German Patent Application No. 10 2013 016 915.1, filed Oct. 11, 2013, and to German Patent Application No. 10 2013 016 126.6, filed Sep. 27, 2013, the entire contents of each of which are hereby incorporated by reference in their entirety for all purposes.

TECHNICAL FIELD

The present invention relates to a self-propelling work machine, preferably in the form of a dump truck or of a truck, having an electric drive comprising at least one electric motor, a generator drivable by an internal combustion engine for the power supply of the electric drive and a braking apparatus for braking the work machine, wherein the named braking apparatus provides a regenerative braking by the electric drive and comprises a feedback apparatus for feeding back electrical motor braking power of the electric motor to the generator to apply the motor braking power on the internal combustion engine. The invention further relates to a method for braking such a work machine.

BACKGROUND AND SUMMARY

With self-propelling work machines such as dump trucks, trucks or other self-propelling off-road vehicles for construction sites, mines and the like, electric drives having at least one electric motor have been used in recent times to utilize the typical advantages of such electric drives with respect to hydrostatic drives such as their better efficiency and an easier maintenance. Considerably lower operating costs can also be achieved at the partly substantial powers due to the substantially better efficiency. The electric drive can in this respect in particular be utilized as a traction drive by means of which at least one wheel or one chain drive of the undercarriage is driven, but also for driving a main work unit such as the milling drum of a surface miner.

In this respect, a generator can be provided for the power supply of the electric drive, said generator being drivable by an internal combustion engine, for example in the form of a diesel engine, of a gasoline engine or of a gas engine, wherein not only the power generator, but also a hydraulic unit, in particular its pump, can be driven by the internal combustion engine to be able to hydraulically drive other adjustment actuators of hydraulic components. With a bulldozer, the adjustment and/or lifting device for the trenching shovel can, for example, be driven by means of such hydraulic actuators. With dump trucks, the dump body can be rocked up and down by means of a hydraulic actuator.

A bulldozer having such a drive concept comprising an electric drive is known, for example, from U.S. Pat. No. 7,950,481, with it being proposed here to arrange an electric motor centrally and to transfer its drive power to different elements to be driven via a differential. It is proposed in this respect to store excess electrical energy which is generated by the generator with an internal combustion engine not utilized to capacity in a battery in order to be able to transfer additional electrical energy in the sense of a boost function to the electric motor when the latter requires a particularly high power, which may the case, for example, on the starting up of the machine. If, conversely, the work machine is to be braked, mechanical brakes in the form of spring pre-loaded disk brakes which can be hydraulically ventilated are actuated. Depending on the size of the work machine and on its purpose, such brakes have to be dimensioned more or less large in order not to overload or overheat on intensive braking procedures over a longer time such as can be the case with bulldozers constantly moving backward and forward or with fully loaded dump trucks traveling downhill.

U.S. Pat. No. 8,395,335 B2 furthermore describes an electric drive system for off-road trucks in which the electrical drive energy is provided by an internal combustion engine which drives a generator. In braking operation, electrical motor braking power provided by the electric motors is transferred to the generator to reduce the fuel consumption of the internal combustion engine. Excess electrical motor braking power is furthermore transferred past the internal combustion engine to electrical auxiliary units to drive these auxiliary units electrically and is finally dissipatively reduced or "burnt", i.e. converted into heat, via electrical braking resistors in the form of a so-called grid box. The distribution of the electrical motor braking power, however, requires a relatively complicated control system while taking account of the electrical energy usable at the auxiliary units. In addition, the thermal load arising at the named grid box has to be taken into account.

It is the underlying object of the present invention to provide an improved work machine of the initially named kind as well as an improved method for braking such a work machine which avoid disadvantages of the prior art and further develop the latter in an advantageous manner. An energy-efficient braking with sufficient decelerations should preferably be made possible using a braking apparatus which is of a simple design and is easy to control.

The named object is achieved by a self-propelling work machine having an electric drive comprising at least one electric motor; the work machine further comprising a generator drivable by an internal combustion engine and for supplying the electric drive with electric current; the work machine further comprising a braking apparatus for braking the work machine, wherein the braking apparatus provides a regenerative braking by the electric drive and comprises a feedback apparatus for feedback of electrical motor braking power of the electric motor to the generator, wherein a braking control apparatus is provided for automatic connection of at least one mechanical brake in dependence on the electrical motor braking power fed back to the internal combustion engine and/or on an operating state of the internal combustion engine acted on by the fed back motor braking power, and by a method for braking such a work machine.

It is therefore proposed to achieve the desired braking effect primarily by regenerative braking via the electric motor or motors and to apply the electrical motor braking power generated in this process on the internal combustion engine and in so doing to take up or to prevent an overload of the internal combustion engine due to excessive fed back motor braking power by connecting a mechanical brake. In accordance with the invention, a braking control apparatus is provided for an automatic connection of a mechanical brake in dependence on the motor braking power fed back to the internal combustion engine and/or in dependence on the operating state of the internal combustion engine acted on by the fed back motor braking power. The braking energy or the electrical motor braking power provided by the at least one electric motor is advantageously primarily fed back to the internal combustion engine when coasting via the generator which converts the electrical motor braking power into mechanical drive power for the internal combustion engine and is used there for the drive of the secondary consumers such as fans, coolers or pumps connected to the internal combustion engine and for overcoming the drag resistances of the internal combustion engine. If the motor braking power applied on the internal combustion engine exceeds a degree compatible for the internal combustion engine and/or if the internal combustion engine reaches a predefined operating state under the effect of the fed back motor braking power, the mechanical brake is automatically connected to avoid or to reduce a further increase of the electrical motor braking power applied on the internal combustion engine. The connection of the mechanical brake can in this respect advantageously take place gently with— where required—successively increasing braking force so that the transition from a braking without a mechanical brake to a braking with a mechanical brake, and vice versa, takes place in the manner of a blending procedure in a gently transiting manner without a deceleration burst. The braking force of the mechanical brake can be gently varied and controlled, in particular regulated, while taking account of the braking power already applied on the internal combustion engine in order to come as close as possible to a desired braking force predefinable by the driver.

In this respect, braking advantageously only takes place using the mechanical brake when the motor braking power fed back to the internal combustion engine reaches the deceleration capacity of the internal combustion engine and of auxiliary units which may be connected thereto.

An increasing electrical motor braking power which is generated by the at least one electric motor can in particular first be applied on the internal combustion engine with an increasing desired or required braking power—for example by increasing actuation of a brake generator and/or by an increasing slope, with the fuel supply to the internal combustion engine being successively reduced until the internal combustion engine no longer consumes any fuel at a constant speed. As the fed back electrical motor braking power increases further, the internal combustion engine can advantageously be revved up beyond a constant engine speed desired per se until a maximum permitted or desired engine speed of the internal combustion engine is reached, with the named revving up of the internal combustion engine advantageously taking place with a blocked fuel supply. If the named maximum speed of the internal combustion engine is reached, the aforesaid braking control apparatus connects the mechanical brakes in order to take up fed back motor braking power increasing even further and hereby to prevent or at least to restrict a further increase in the fed back motor braking power transferred to the internal combustion engine.

The braking control apparatus therefore advantageously provides a plurality of braking stages which can be connected after one another to take up the desired or required braking power. Initially or primarily, electromotive motor braking power is applied on the internal combustion engine without connecting mechanical brakes in order to be able to operate the internal combustion engine in an energy-efficient manner, on the one hand, and to avoid an unnecessary thermal load or wear of the mechanical brakes, on the other hand. Only when a deceleration capacity of the internal combustion engine and of the auxiliary units connected thereto has been reached or when the compatibility limit of the application of the electrical motor braking power on the internal combustion engine has been reached are the mechanical brakes connected in a further stage. In this respect, within the aforesaid first braking stage in which the electrical motor braking power is only or at least primarily applied on the internal combustion engine, the fuel supply is in this respect initially reduced in a first sub-stage with a substantially constant internal combustion engine speed for so long until the fuel supply is completely cut off. Once the fuel supply is cut off, a revving of the internal combustion engine is permitted in a second sub-stage.

The braking control apparatus can advantageously control the braking power which can be applied on the internal combustion engine by varying the power pick-up of at least one auxiliary unit which is connected to the internal combustion engine, for example in the form of a fan, of a cooling apparatus or of a pump. The braking control apparatus can in particular increase the power pick-up of at least one such auxiliary unit before the mechanical brake is used. Not only the regenerative motor braking power and thus also the total braking power can hereby be increased an controlled in a more variable manner and can the wear of the mechanical brake be delayed, but above all an even more efficient operation of the work machine can also be achieved, for example in that a fan or a cooling apparatus is ramped up in a power respect beyond the degree required per se to cool corresponding units more than absolutely necessary so that then, with a subsequent ascent or also on a level path, the auxiliary unit can be switched off for longer or can be operated at a lower power than usual. In a further development of the invention, it is, however, likewise possible to operate an auxiliary unit such as a pump in a dissipative manner with a higher power pick-up in order to increase the regenerative motor braking power, for example by increasing the flow rate of the pump, for example by connecting a flow resistance.

The named braking control apparatus is configured in a further development of the invention such that the mechanical brakes remain unactuated or released for so long until the desired or required braking power can be applied on the internal combustion engine and optionally on auxiliary units connected thereto via electrical motor braking and feeding back the motor braking power, in particular for so long until the fed back motor braking power does not exceed a predefined limit value and/or the internal combustion engine acted on by the fed back motor braking power does not leave a predefined operating state or operating state range, in particular does not exceed a predefined engine speed.

In a further development of the invention, the feedback apparatus can manage without any electrical brake resistors, in particular free of so-called grid boxes. The feedback apparatus can hereby be configured and controlled simply overall and no thermal load limits at the electrical brake resistors have to be taken into account. The problems resulting with heavy precipitation, in particular of air-cooled brake resistors, can also be avoided, whereby the work machine becomes safer and can moreover also be of small construction. With air-cooled brake resistors, the danger is known of ground faults due to penetrating moisture, which can be avoided by a design of the feedback apparatus without braking resistors.

In order also not to allow a feedback power which is too high to arise on strong braking and to be able to reliably take up the portion of motor braking power which cannot be applied at the internal combustion engine, the connectable mechanical brake can be configured in an advantageous further development of the invention as a wet brake which can provide a sufficiently high braking power without thermally overheating. A mechanical multi-disk brake can in particular be provided which has oil cooling and which can be connected indirectly or directly to the drive element to be braked, for example to a wheel of the undercarriage or to a chain drive pinion. In a further development of the invention, a plurality of such mechanical brakes can be connected to a plurality of the drive elements; for example, corresponding wet brakes can be provided at each wheel of a truck.

In an advantageous further development of the invention, the electrical motor braking power generated in total by the electric motor or motors can be completely transferred to the generator connected to the internal combustion engine and the mechanical drive power generated by the generator in this process can be completely transferred to the internal combustion engine. The feedback apparatus can so-to-say be configured in one strand and cannot provide any branches or junctions which would transfer different portions of the fed back motor braking power to different drive elements. It would admittedly generally be possible to branch off a portion of the fed back motor braking power, for example directly in the form of electrical energy to electrical secondary units or not only to drive the internal combustion engine with the drive power of the generator, but also other drive elements coupled to the generator such as a secondary generator. With the aforesaid single-strand configuration of the feedback apparatus and with the substantially complete conversion of the fed back motor braking power into mechanical drive power for the internal combustion engine, however, no different systems have to be monitored, but the mechanical brake can rather only be connected substantially in dependence on the operating state of the internal combustion engine.

The brake control apparatus can in particular connect the mechanical brake in dependence on the engine speed of the internal combustion engine, and indeed in particular only when the speed of the internal combustion engine reaches a predefined maximum speed. The named brake control apparatus can for this purpose be connected to speed detection means which provide the named speed of the internal combustion engine.

The named brake control apparatus can furthermore comprise engine control means for reducing the fuel supply to the internal combustion engine which initially reduce the fuel supply at a constant speed of the internal combustion engine, in particular reduce it to an increasing degree such that with an increasing application of electrical motor braking power on the internal combustion engine the fuel supply is successively driven to zero and in so doing the engine speed is kept constant and/or at least at a predefined minimal speed, for example the idling speed.

The braking control apparatus can in this respect advantageously comprise braking force control means which resets or readjusts the braking force generated by the mechanical brake on reaching the maximum internal combustion engine speed, in particular such that, with a further increasing braking power requirement—for example due to a further increasing actuation of the braking generator—the braking force of the mechanical brake is further increased and with a further dropping braking power requirement the braking force of the mechanical brake is reduced, however, preferably only so much that the internal combustion engine is still held at its predefined maximum speed. The braking force of the mechanical brake is preferably regulated such that the maximum possible electrical motor braking power is applied on the internal combustion engine and on the optionally connected auxiliary units.

The present invention will be explained in more detail in the following with reference to a preferred embodiment and to associated FIG.

BRIEF DESCRIPTION OF FIGURES

FIG. 2 shows a schematic representation of the brake energy flow on the braking of the work machine.

DETAILED DESCRIPTION

Figure 1:
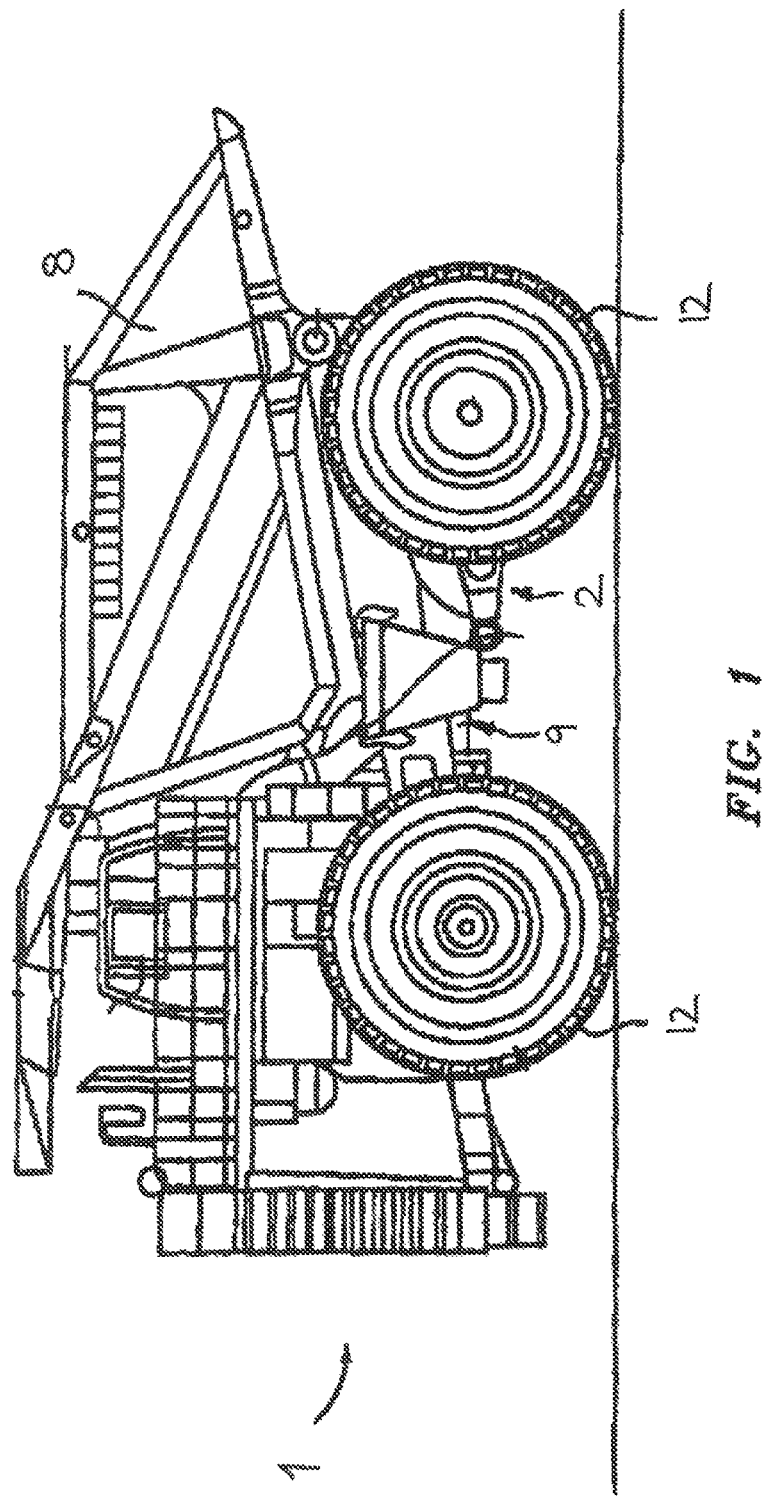
FIG. 1 shows a schematic side view of a work machine in the form of a truck which can be configured as a dump truck.
Figure 3:
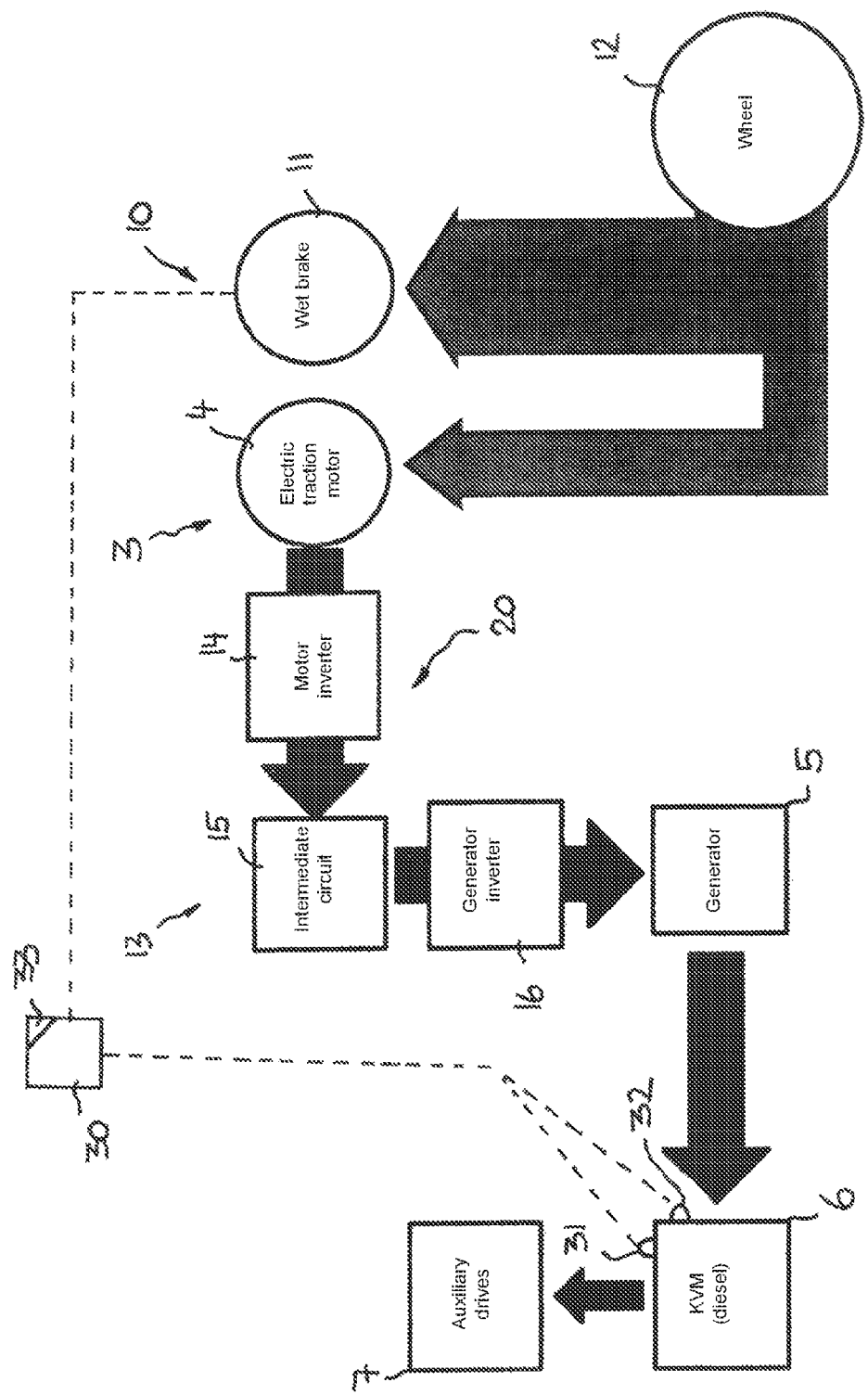

As FIG. 1 shows, the self-propelling work machine 1 can be configured, for example, as an off-road truck, in particular in the form of a dump truck, and can comprise as an undercarriage 2 a plurality of wheels 12 which are distributed over a plurality of axles and which support the chassis or the frame of the work machine 1. It is, however, understood that the work machine can generally also be configured in another form, for example in the form of another construction machine or mining machine having a wheel undercarriage or chain undercarriage.

The drive systems of the work machine 1 comprise at least one electric drive 3 having at least one electric motor 4 which can serve as a traction drive and which can drive the wheels 12. In this respect, one electric motor 4 can simultaneously drive a plurality of wheels 12, for example the wheels 12 of an axle, optionally via a power-split transmission or a differential. Alternatively, a single wheel drive can also be provided in which a separate electric motor 4 is associated with each driven wheel 12.

As FIG. 2 shows, the electric drive 3 is supplied with electric current from a generator 5, with the named generator 5 being driven from an internal combustion engine 6 which can be configured, for example, as a diesel engine or as a gasoline engine or also as a gas engine. The at least one electric motor 4 or the optional plurality of electric motors 4 is/are in this respect connected to the generator 5 via power electronics 13 which can comprise a motor inverter 14 associated with the respective electric motor 4 and a generator inverter 16 associated with the generator 5, with an intermediate circuit 15, in particular in the form of a DC voltage intermediate circuit, being able to be provided between the motor inverter 14 and the generator inverter 16, cf. FIG. 2. The generator inverter 16, the intermediate circuit 15 and the motor inverter 14 are in this respect advantageously configured as working bidirectionally to be able to transfer current produced by the generator 5 onto the electric motor 4 in the working mode in which the generator 5 is driven by the internal combustion engine 6 and to be able to feedback current produced by the electric motor 4 in braking operation in the converse direction to the generator 5, as will still be explained.

The work machine 1 can furthermore comprise at least one auxiliary drive 7 which can likewise be driven by the named internal combustion engine 6. The named auxiliary drive 7 can, for example, be a hydraulic unit or a hydraulic drive which can comprise a hydraulic pump driven by the named internal combustion engine 6 to be able to hydraulically drive corresponding auxiliary units. For example, an auxiliary drive 7 can serve for adjusting the loading trough 8 of the dump truck shown in FIG. 1 and can comprise for this purpose at least one adjustment actuator 9, for example in the form of a hydraulic actuator such as a hydraulic cylinder to be able to tilt up the loading trough 8 for unloading.

The named auxiliary drives 7 can, however, also comprise still further auxiliary units such as cooling units, fans, steering assistance systems and the like.

A braking apparatus 10 for braking the work machine 1, on the one hand, comprises a mechanical brake 11 which can brake a single wheel or optionally an axle, with such a mechanical brake 11 advantageously being associated with each of the wheels 12. The named mechanical brake 11 is advantageously configured as wet brake in a further development of the invention, for example in the form of an oil-cooled multi-disk brake, with the named brake being able to be configured, for example, as spring pre-loaded and electromechanically ventilated, but can also be actuated by hydraulic pressure in another manner.

The named braking apparatus 10 furthermore comprises the use of the aforesaid at least one electric motor 4 as the generator in order first to provide the desired braking power by the electric drive 3 by way of regenerative braking. The electrical motor braking power provided in this respect by the electric motor(s) 4 is transferred by a feedback apparatus 20 to the generator 5 connected to the internal combustion engine 6 to operate the generator 5 as the motor and to drive the internal combustion engine 5 at least in an assisting manner. The named feedback apparatus 20 in this respect comprises the already previously named motor inverter 14 which is associated with the respective electric motor 4, then the intermediate circuit 15 connected thereto and the generator inverter 16 via which the generator connected to the internal combustion engine 6 can be controlled in feedback operation.

As FIG. 2 shows, the named feedback apparatus 20 can be configured in one strand and the motor braking power generated by the electric motors 4 can be essentially completely transferred to the generator 5, with the mechanical drive power generated by the generator 5 in this respect being able to be essentially completely transferred to the internal combustion engine 6. Alternatively to such a complete application of the motor braking power on the internal combustion engine 6, an electrical braking resistor could optionally also be connectable to dissipatively reduce a portion of the fed back motor braking power to such a braking resistor.

A braking process is in this respect controlled by means of a braking control apparatus 30 which in particular controls or regulates the connection of the mechanical brake 11 and optionally also the power pick-up of at least one of the auxiliary units 7 in dependence on the fed back electrical motor braking power and/or on the operation state of the internal combustion engine 6 acted on by the fed back motor braking power. The named braking control apparatus 30 can for this purpose be connected to detection means for detecting the operating state of the internal combustion engine 6, for example to speed detection means 31 and optionally to temperature detection means to be able to avoid an overheating in coasting operation. Other detections means for monitoring other operating parameters, for example also the operating state of the auxiliary units, can likewise be provided to be able likewise to connect the mechanical brakes on a reaching of limits which are critical here. The named braking control apparatus 30 can furthermore also be connected to detection means for detecting the fed back motor braking power in order optionally also to be able to take account of a maximum feedback power on the connection of the mechanical brake 11. The fed back electrical motor braking power can in this respect generally be detected in different manners, for example by direct determination of electrical characteristics such as current or voltage and operating values of electrical components dependent thereon. The fed back motor braking power can, for example, be determined via an inverter present in the feedback circuit. Alternatively or additionally, the fed back motor braking power can, however, also be determined indirectly, for example by measuring a torque which is generated by the generator while being acted on by the fed back electrical energy.

The named braking control apparatus 30 can furthermore be connected to engine control means 32 by means of which the fuel supply to the internal combustion engine 6 can be reduced and optionally fully cut off to be able to operate the internal combustion engine 6 in the first braking stage in coasting operation with a reduced fuel supply.

If a specific braking force is desired from a machine operator, for example by actuating a brake pedal or brake lever or by actuating a braking request button, the braking control apparatus 30 can control or regulate the braking process, and indeed in particular as follows: First, in coasting operation, the motor braking power provided by the electric motors 4 is transferred via the generator inverter 16 to the generator 5 which converts the fed back electrical motor braking power into mechanical drive power for the internal combustion engine 6 and transfers it to the named internal combustion engine 6. This application of the electrical motor braking power on the internal combustion engine 6 is there utilized for driving all the auxiliary units or auxiliary drives 7 as well as for overcoming the drag resistances of the internal combustion engine 6. In a first braking stage, the braking control apparatus 30 in this respect reduces the fuel supply to the internal combustion engine 6 via the engine control means 32 with a substantially constant engine speed to maintain per se the operating state of the internal combustion engine 6 and of the auxiliary drives 7 connected thereto, but in so doing to reduce the fuel consumption. This first braking stage is realized for so long until the fuel supply has optionally been reduced to zero.

If further braking power is required, the braking control apparatus 30 allows a revving of the internal combustion engine 6 and thus still applies the braking power essentially completely on the internal combustion engine 6. In this respect, the braking control apparatus 30 monitors the speed of the internal combustion engine 6 via the speed detection means 31 and allows the revving until the internal combustion engine 6 reaches its preferably maximum speed. In this respect, the power pick-up of the auxiliary units 7 can also be increased to provide further braking power and to utilized efficiency potential.

If the maximum speed is reached, but if additional braking power is still required, on the other hand, the braking control apparatus 30 automatically connects the mechanical brake 11 in order to prevent the internal combustion engine 6 from over-revving. The braking control apparatus 30 in this respect regulates the braking force of the mechanical brakes 11 via a braking force regulator 33 such that the internal combustion engine 6 is substantially maintained at its maximum speed, i.e. the maximum possible portion of braking power is still applied on the internal combustion engine 6. Only the portion of the required braking power beyond the deceleration capacity of the internal combustion engine 6 and of the connected auxiliary units 7 is taken up via the mechanical brake 11.

The invention claimed is:

1. A self-propelling work machine having an electric drive comprising at least one electric motor; the work machine further comprising a generator drivable by an internal combustion engine and for supplying the electric drive with electric current; the work machine further comprising a braking apparatus for braking the work machine, wherein the braking apparatus provides a regenerative braking by the electric drive and comprises a feedback apparatus for feedback of electrical motor braking power of the electric motor to the generator, wherein a braking control apparatus is provided for automatic connection of at least one mechanical brake in dependence on the electrical motor braking power fed back to the internal combustion engine and/or on an operating state of the internal combustion engine acted on by the fed back motor braking power,
wherein the braking control apparatus comprises a first braking stage in which the braking power takes place only by way of electric motor braking and of applying the electrical motor braking power on the internal combustion engine, wherein, in a first sub-stage, a fuel supply to the internal combustion engine is first reduced with a constant engine speed and, in a second sub-stage with a cut-off fuel supply, a speed increase of the internal combustion engine is permitted for increasing the braking power until a predefined maximum speed is reached.

2. The self-propelling work machine in accordance with claim 1, wherein the braking control apparatus is configured such that first a regenerative braking and second a braking by the mechanical brake takes place when the electrical motor braking power fed back to the internal combustion engine reaches a deceleration capacity of the internal combustion engine and of auxiliary units optionally connected to the internal combustion engine.

3. The self-propelling work machine in accordance with claim 2, wherein the braking control apparatus is configured such that during the regenerative braking a power pick-up of at least one connected auxiliary unit is increased before the mechanical brake is connected.

4. The self-propelling work machine in accordance with claim 2, wherein at least one auxiliary unit connected to the internal combustion engine comprises a cooling apparatus and/or a pump whose power pick-up is controllable.

5. The self-propelling work machine in accordance with claim 1, wherein the feedback apparatus is free of electrical braking resistors.

6. The self-propelling work machine in accordance with claim 1, wherein the electrical motor braking power of the at least one electric motor is completely transferred to the generator connected to the internal combustion engine and mechanical drive power generated by the generator is completely transferred to the internal combustion engine.

7. The self-propelling work machine in accordance with claim 1, wherein the mechanical brake comprises at least one wet brake.

8. The self-propelling work machine in accordance with claim 7, wherein the wet brake comprises a multi-disk-brake with oil cooling.

9. The self-propelling work machine in accordance with claim 1, wherein the braking control apparatus is connectable to a speed detection device for detecting a speed of the internal combustion engine, with the braking control apparatus being configured such that the mechanical brake is connected on an exceeding of a predefined speed of the internal combustion engine and the mechanical brake is released on a falling below of the predefined speed of the internal combustion engine.

10. The self-propelling work machine in accordance with claim 1, wherein the brake control apparatus comprises a braking force regulator for regulating a braking force applied by the mechanical brake, with the braking force regulator configured such that in a braking mode in which the mechanical brake is connected, the braking force applied by the mechanical brake is regulated such that the internal combustion engine is maintained at a maximum permitted speed or at a predefined speed.

11. The self-propelling work machine in accordance with claim 10, wherein the braking force regulator is configured such that an electric motor braking force and/or the mechanical braking force and/or a sum of the electric motor braking force and of the mechanical braking force corresponds to a desired braking force.

12. The self-propelling work machine in accordance with claim 1, wherein the braking control apparatus is connectable to an engine control device for controlling a fuel supply to the internal combustion engine, the engine control device configured such that in braking operation with feedback of electrical motor braking power to the internal combustion engine, the fuel supply is reduced such that the internal combustion engine is maintained at a constant speed.

13. The self-propelling work machine in accordance with claim 1, wherein the feedback apparatus comprises at least one motor inverter associated with the at least one electric motor and at least one generator inverter associated with the generator, the feedback apparatus further comprising at least one intermediate circuit provided between the motor inverter and the generator inverter.

14. The self-propelling work machine in accordance with claim 13, wherein the at least one intermediate circuit is a DC voltage intermediate circuit.

15. The self-propelling work machine in accordance with claim 1, wherein the work machine is a dump truck.

16. A method for braking a work machine, with at least one electric drive comprising at least one electric motor, the work machine further comprising a generator drivable by an internal combustion engine for a power supply of the electric drive, the work machine further comprising a braking apparatus for braking the work machine, wherein the at least one electric motor is operated as a generator and an electrical motor braking power generated is fed back to the generator with a feedback apparatus and a mechanical drive power generated by the generator is applied to the internal combustion engine, wherein a mechanical brake is automatically connected or disconnected by a braking control apparatus in dependence on the electrical motor braking power fed back to the internal combustion engine and/or on an operating state of the internal combustion engine acted on by the fed back electrical motor braking power,
wherein with a small desired braking force in a first braking stage at an unchanging speed of the internal combustion engine, a fuel supply to the internal combustion engine is reduced, with an increased desired braking force in a second braking stage with a cut-off fuel supply, the internal combustion engine is revved up while being acted on by the fed back electrical motor braking power up to a predefined maximum speed, and with a further increased desired braking force the mechanical brake is only connected in a third braking stage when the internal combustion engine has reached the predefined maximum speed, and a maximally achievable braking power of the internal combustion engine and of auxiliary units optionally connected thereto is always still smaller than a desired braking force.

17. The method in accordance with claim 16, wherein in the second braking stage a power pick-up of at least one auxiliary unit connected to the internal combustion engine is increased.

18. The method in accordance with claim 17, wherein the at least one auxiliary unit is a cooling fan or a pump; and wherein the work machine is a dump truck.

* * * * *